United States Patent [19]

Fink et al.

[11] 3,870,557
[45] Mar. 11, 1975

[54] TREATMENT OF POROUS WEB STRUCTURES WITH AQUEOUS SUSPENSIONS OF A SYNTHETIC RESIN

[75] Inventors: Herbert Fink, Bickenbach; Manfred Munzer, Bensheim; Horst Dinklage, Darmstadt-Arheilgen, all of Germany

[73] Assignee: Rohm GmbH, Darmstadt, Germany

[22] Filed: July 7, 1972

[21] Appl. No.: 269,731

[30] Foreign Application Priority Data
July 17, 1971 Germany............................ 2135828

[52] U.S. Cl... 117/161 R, 117/139.5 A, 117/143 A, 117/145, 117/161 UC, 117/161 UN
[51] Int. Cl............................................... B44d 1/02
[58] Field of Search 117/161 UC, 161 UN, 139.5 A, 117/143 A, 145, 155 R, 140 A; 260/17 A, 17 R, 29.6 T, 29.6 TA, 29.6 M, 29.6 WA, 80 M, 86.1 R, 86.1 E, 86.1 N

[56] References Cited
UNITED STATES PATENTS

| | | | |
|---|---|---|---|
| 2,318,429 | 5/1943 | Smith | 117/143 A |
| 2,343,089 | 2/1944 | Smith | 117/161 UC |
| 2,343,092 | 2/1944 | Smith | 117/141 X |
| 2,343,094 | 2/1944 | Smith | 260/29.6 WA |
| 2,346,755 | 3/1944 | Hemming | 260/29.6 WA |
| 2,422,646 | 6/1947 | Starck | 260/29.6 WA |
| 2,949,386 | 8/1960 | Cassel | 117/161 UN |
| 2,982,682 | 5/1961 | Matlin | 117/161 UN |
| 2,989,423 | 6/1961 | Malmquist | 117/161 UC |
| 3,015,595 | 1/1962 | Moser | 117/161 UN |
| 3,023,482 | 3/1962 | Gilboy | 117/161 UN |
| 3,101,292 | 8/1963 | Kine | 117/161 UC |
| 3,228,790 | 1/1966 | Sexsmith | 117/161 UC |
| 3,539,434 | 11/1970 | Spaulding | 117/161 UN |
| 3,702,785 | 11/1972 | Knechtges | 117/140 A |

OTHER PUBLICATIONS

"Preparations, Properties, and Uses of Acrylic Polymers," bulletin of Rohm & Haas Co., received June 9, 1967.

*Primary Examiner*—Cameron K. Weiffenbach
*Attorney, Agent, or Firm*—Curtis, Morris & Safford

[57] ABSTRACT

Method of treating porous planar web structures, such as woven and non-woven fabrics, with an aqueous suspension of a soft synthetic resin having a glass transition temperature below 35°C. to produce strengthened and coated webs having good absorbability and air permeability.

Web structures made in this way.

Aqueous suspensions of a synthetic resin having a glass transition temperature below 35°C.

3 Claims, No Drawings

TREATMENT OF POROUS WEB STRUCTURES WITH AQUEOUS SUSPENSIONS OF A SYNTHETIC RESIN

The present invention relates to treating porous web structures with an aqueous suspension of a synthetic resin, to the structures so treated, and to the suspensions used for treating the structures.

It is known in the art to strengthen and coat planar web structures, particularly textile-like materials, with synthetic resin dispersions in which a polymer is present in a latex-like form. Such dispersions are prepared starting from a two-phase system comprising a monomer or a monomer mixture and water and involve polymerizing the monomer or copolymerizing the monomers in the presence of emulsifiers and with mechanical stirring, under the influence of a water-soluble accelerator which produces free radicals. This process is probably the polymerization technique most used at present on a technical scale. Synthetic resin dispersions are employed in a wide variety of uses, including the aforementioned strengthening and coating of web structures.

During drying, a synthetic resin dispersion applied to a surface forms a coherent film to practically the same extent as when the resin is applied as a solution in an organic solvent and the solvent is evaporated therefrom. The formation of such a film is desired in many cases. In other cases, special steps may be taken to make the resin film formed on the surface or in the interior of the web structure permeable to air and water vapor, i.e., to make it porous. Such is the case, for example, if an artificial leather or a textile material to be employed in the manufacture of clothing is prepared using such dispersions. Even in those cases in which only a superficial coating is to be prepared on a web surface, for example on a textile, the dispersed synthetic resin particles penetrate into the material because the voids or pores of the latter are, as a rule, larger than the dispersed resin particles. It is known to those skilled in the art that an undesirable soaking of the dispersed particles into the material to be coated can be decreased by thickening the dispersion using known techniques. Nevertheless, penetration of the dispersion often cannot be hindered to the extent desired, particularly if the dispersion is applied by machine.

According to the present invention, coating and strengthening agents for the preparation or improvement of textile web structures are disclosed, the use of which produces products which remain porous or microporous. Agents according to the present invention can be used, for example, for the formation of heat-sealable or self-adhering coatings on web structures. In other cases, non-woven fabrics can be strengthened with the new agents, textiles can be made non-slip, and decorative fabrics and rugs can be coated on the backing in order to anchor the burls thereof or to make them skid-resistant, for example. Also, textiles can be laminated for many purposes using the agents of the present invention. It should be emphasized that textiles and non-woven fabrics treated with the resin suspensions of the invention to improve their mechanical strength maintain their absorbability, so that textiles or non-woven fabrics prepared in this manner can be used, for example, either as an outstanding substitute for chamois or also as hygienic articles. In contrast, it is known in the art that the absorbability of textile structures which have been conventionally treated with synthetic resin dispersions is decreased to a considerable degree.

The properties of the coating and strengthening agents of the invention can be varied over wide limits by the choice of the kind and amount of the monomers to be polymerized and by the conditions observed during their polymerization, in the same sense that this is known for the preparation of synthetic resin dispersions. Hard, soft, intermediate, or, as already mentioned, even self-adhering coatings can be prepared with the coating and strengthening agents according to the present invention.

The coating and strengthening agents of the type under discussion are differentiated from the synthetic resin dispersions heretofore used for the same purposes in that they are aqueous suspensions of homopolymers or copolymers, prepared by a suspension polymerization process (also called a pearl polymerization process), in which the resins employed form "soft pearls."

As a measure of the softness or hardness of the suspended polymer, the glass transition temperature, $T_g$, is used. It should be mentioned that the values ($T_{\lambda\,max}$) obtained with the aid of a torsion swing test (according to DIN 53445) can also be used to characterize these suspension polymers. For a large number of macromolecular compounds, the glass transition temperatures can be determined from tabulated values. For example, in the "Polymer Handbook" of Brandrup and Immergut, Interscience Publishers, John Wiley & Sons, New York (1966), in Chapter III entitled "Solid State Properties," pages 61 – 85, the glass temperatures of a very large number of homopolymers and copolymers are listed, and methods for determining this characteristic value, and its significance, are explained.

Homopolymers and copolymers of the kind to be employed according to the present invention can be characterized as being prepared as suspension polymers, as already mentioned; as being used in the form of an aqueous suspension; and, additionally, as having a $T_g$ value less than 35°C. (less than 308°K).

As known in the art, the suspension polymerization or pearl polymerization of polymerizable monomers can be viewed as a well-cooled block polymerization in which water-insoluble monomers are dispersed in water in the form of fine droplets by stirring in the presence of a so-called suspension stabilizer or suspending agent, for example gelatin, pectin, a water-soluble starch, a synthetic high-molecular weight material, or, also, a substance suspended in the water, such as talc, magnesium carbonate, or aluminum hydroxide, and are then polymerized under the influence of accelerators soluble in the monomers. In the course of the polymerization, the droplets, which at first are liquid, become rubbery and, finally, become solid. The goal of suspension polymerization has heretofore in all cases been the preparation of solid products which could be separated from the aqueous phase in a simple manner, for example by filtration, and which were obtained as "hard" (i.e. non-adherent) bead-like particles. The preparation of suspension polymers from "soft synthetic resins," i.e., the preparation of products which, on separation of the aqueous phase, stick together, has heretofore seemed contrary to achieving the desired goal of a suspension polymerization, namely the ability to separate the polymer in a simple way and to dry it. However, the use of just such pearl polymers as coating and strengthening agents for porous planar structures of all types is a feature of the present invention.

Among the planar structures contemplated to be treated are not only textile fabrics, weaves, and non-woven fabrics, but also leather, paper, or planar structures made of inorganic fibers such as glass fibers or mineral wool. In particular cases, it can also be advantageous to use the suspension polymers of the present invention for coating or adhering wood.

It is not necessary to go more into detail concerning the technique of suspension polymerization to explain the present invention. It is sufficient to note that one skilled in the art can influence the size of the pearls produced by a choice of the polymerization conditions, particularly by the intensity of the stirring, and by the amount and kind of the suspension stabilizer. By these measures, pearls with a diameter varying from 0.01 mm to several millimeters, for example, can be produced.

In general, for purposes of the present invention average bead diameters between about 0.05 mm and about 0.5 mm are preferred.

While it is indispensable to add one of the aforementioned suspension stabilizers or suspending agents to the system for the formation of defined monomer droplets and to hinder the adhesion of the resulting spherical polymer particles during the polymerization process, it can be advantageous additionally to stabilize the finished suspension, specifically to prevent settling of the solid particles when their density is greater than that of the aqueous phase or to prevent floating of the solid particles when their density is less than that of water, and thereby also to hinder a possible adhering of the particles on long storage.

With pearls whose density is greater than one, such stabilization is achieved, for example, by adding water-soluble salts, such as sodium chloride, or other materials which affect the density of the aqueous phase, to the suspension.

Another possibility for stabilization is to thicken the aqueous phase. For this purpose, natural macromolecular materials, such as starch, alginate, or pectin, or derivatives thereof, such as methyl cellulose, carboxymethyl cellulose, and the like, and synthetic macromolecular products are suitable. Exemplary of the last-mentioned class of materials are copolymers containing carboxy groups or alkali salts thereof, such as copolymers of acrylic acid or methacrylic acid, as well as polyvinyl pyrrolidone.

The monomers of principal interest which can be employed in the present invention and which can be converted into pearl polymers by a suspension polymerization process are vinyl and vinylidene monomers including acrylate esters having 1 – 18 carbon atoms in the alcohol portion thereof, methacrylate esters having 4 – 18 carbon atoms in the alcohol portion thereof, butadiene, vinylidene chloride, and vinyl esters. These monomers can be polymerized in admixture with each other or together with such other vinyl and vinylidene monomers which, as homopolymers, give hard products. In the latter case, the amount of monomer producing a hard homopolymer (for example methyl methacrylate, methyl acrylate, acrylonitrile, methacrylonitrile, acrylamide or methacrylamide and quaternization products thereof, or styrene), which can be used is limited by the requirement that the glass transition temperature of the resulting polymer shall not exceed the limiting value which is characteristic of the invention. The inclusion of ethylenically unsaturated mono- and di-carboxylic acids can be advantageous in many cases, in which case the amount of these components may be only so great that the resulting products are not water-soluble, although they may have limited swellability in water.

It should be mentioned that the glass transition temperature, $T_g$, characteristic of the suspension polymers to be employed according to the present invention, can be adjusted in many cases by adding so-called "external plasticizers," such as the phthalic acid esters, although the monomer or monomer mixture to be polymerized would — without the addition of such plasticizers — form a polymer having too high a glass transition temperature.

Cross-linking monomers can be incorporated into the structure of the suspension polymers according to the invention, with the proviso, however, that cross-linking of the suspended particles may take place only to such an extent that the desired formation of a porous film and its tight adhesion to the material to be coated or strengthened are not hindered. An example of such cross-linking mechanisms is the use, as comonomers, of methylol- or methylol ether-compounds of acrylamide or methacrylamide, or the use of monomers having at least two carbon-carbon double bonds in the molecule. Also, as is known in the art, a cross-linking of macromolecular compounds can be achieved by grafting reactions.

It can be advantageous in particular cases to combine the agents of the present invention with synthetic resin dispersions heretofore known in the art, for example to increase the film-forming properties of the resin. Also, the use of mixtures of different synthetic resin suspensions which are different from the point of view of composition, particle size, or molecular weight, can be advantageous.

Synthetic resin suspensions according to the present invention can be prepared to advantage with a solids content from 50 – 70 percent by weight and can be stored and shipped in this form, optionally after taking the aforementioned measures for stabilization.

It should be noted that products which are almost made to order for any desired purpose can be prepared by varying the chemical composition of the suspension polymer and its average particle size. It is common to all these products that they can be stored for a long period, with or without the use of additional stabilizing steps.

The agents of the present invention can be put on a surface which is to be treated to coat it or strengthen it in many different ways, for example by painting, printing with rolls or templates, by padding, or by spraying. In many cases, it can be advantageous to apply a foam of a type known in the art. The amount of material applied may vary widely depending on the nature of the web being treated, the resin employed, and the effect desired. In general, the amount of resin remaining in the web after drying is between about 10 g/m² and about 200 g/m².

Drying is conveniently done at temperatures between about 80°C. to about 180°C., depending on the hardness or softness of the resin employed.

A better understanding of the present invention and of its many advantages will be had by referring to the following specific Examples, given by way of illustration.

I. Preparation of Synthetic Resin Suspensions According to the Invention

The pearl polymers described in the accompanying Table are prepared either in a 2 liter round glass flask having a triangular stirrer or in a 100 liter kettle having an impeller stirrer and wave-breaker. Heating in the first case is carried out with a water bath; in the second case, a heating mantle with circulating water is employed. The apparatus is in each case provided with temperature sensors, a reflux condenser, and an arrangement for flushing with inert gas. The rate of stirring can be varied with a gear arrangement. For the polymerization of monomers which are gaseous at the polymerization temperature (for example vinylidene chloride), the 100 liter kettle is sealed pressure-tight.

The polymerization is carried out as follows.

The suspending agent (suspension stabilizer) is dissolved or suspended in the total amount of de-ionized water with stirring, with the introduction of an inert gas (for example nitrogen or carbon dioxide), and with heating to the polymerization temperature (65°C. – 80°C.). As a water-soluble suspending agent, either a partially-hydrolyzed polyvinyl acetate (commercially available under the tradename "Mowiol N 70 – 88") or the sodium salt of a copolymer formed between methacrylic acid and one of its higher alkyl esters having more than four carbon atoms in the alcohol portion is used, as can be seen from the Table. In the Table, the former suspending agent is designated as "PVA" and the latter as "PMAA-copolymer." To prepare a water-insoluble suspending agent, aluminum hydroxide is precipitated from aluminum sulfate using a soda solution. To improve the suspending action, 5 percent, calculated on the amount of $Al(OH)_3$, of a $C_{14} - C_{16}$ alkyl sulfonate in the form of its sodium salt (commercially available under the tradename "Statexan K 1") is added.

The monomer phase, which contains the initiator and optional molecular weight regulators and/or other additives such as plasticizers, dyestuffs, and the like in dissolved form, is introduced into the solution or suspension of suspending agent and is dispersed in the form of fine droplets therein by the shearing action of the stirring.

The form and rate of revolution of the stirrer are variable over wide limits. One requirement is that the stirring system, in addition to dispersing the monomer into particles of the desired size, also produces a vertical agitation of the kettle contents which is sufficiently strong to hinder the floating or sinking of the monomer droplets due to density differences between the water phase and the monomer phase.

As monomers suitable for the pearl polymerization, principally those which are insoluble or difficultly soluble in water come into consideration. However, water-soluble monomers such as acrylic acid or methacrylic acid or their amides or substituted amides can also be employed in minor amounts. It is decisive for the success of such a pearl polymerization that the equilibrium distribution of these monomers between the water phase and the monomer phase permits polymerization within the monomer droplets. The weight ratio between the water phase and the monomer phase is varied between 4:1 and 1.5:1. At the ratio of 3:1 which is generally used, the following batch sizes are involved:

2 liter round flask: 900 g water; 300 g monomer
100 liter kettle : 45 kg water; 15 kg monomer In choosing auxiliary polymerization agents (initiator, chain transfer agent), the same considerations apply to the preparation of soft pearls as pertain to pearl polymerization generally, for example as to the solubility behavior of these additives towards water and the monomer.

The compositions of the pearl polymers prepared are set forth in the following Table.

During the polymerization, the exterior temperature (e.g., the water bath or circulating heating) is held constant. The interior temperature rises because of the heat of polymerization which was released and, after about 30 – 120 minutes, reaches a maximum which is about 10° – 20°C. above the starting temperature.

The temperature so reached is held constant for about two hours by regulation of the heating. Thereafter, the batch is cooled to about 25°C. and introduced into a storage container.

By subsequent separation of a portion of the water phase, the solids content of the pearl suspension is adjusted to 50 percent.

Since as a rule there are differences in density between the pearl polymer and the water phase, the polymer either settles or floats. However, the dispersing agent added prior to the polymerization generally suffices to inhibit an adhesion of the pearls under these conditions, even on long storage.

The average particle size of the polymer pearls is determined microscopically in those cases where it is given.

For characterization of the molecular size, the $\eta_{sp}/c$-value measured at 20°C. in chloroform is reported [cf. Makromolekulare Chemie 7, 294 (1952)]. The molecular weights of the polymers are in excess of 50,000.

Suspensions A – D are prepared in a polymerization kettle at a temperature of 75°C. stirred at a rate of 75 rpm. Suspensions E – H are prepared in a flask stirred at 470 rpm at a polymerization temperature of 75°C. (65°C. for suspension G).

The average size of the particles in the suspensions is 0.20 mm, except for suspensions B and D which have an average particle size of 0.25 mm.

The amounts of suspending agent, initiator, and chain transfer agent are reported in percent by weight of the monomer mixture.

TABLE

| Suspension | Suspending Agent (%) | Monomer | Initiator (%) | Chain-Transfer Agent (%) | $\eta sp/c$ (cm³/g) | $T_u$ (°C.) |
|---|---|---|---|---|---|---|
| A | 0.4 Al(OH)₃ | Butylacrylate/ Methylmethacrylate/ Acrylonitrile (50/30/20) | 0.5 Lauroyl peroxide 0.2 t-butyl per-octoate | 0.2 Dodecyl mercaptan | 84 | +25 |

TABLE —Continued

| | Composition of Polymerization Batch | | | | | |
|---|---|---|---|---|---|---|
| Suspension | Suspending Agent (%) | Monomer | Initiator (%) | Chain-Transfer Agent (%) | $\eta sp/c$ (cm³/g) | $T_u$ (°C) |
| B | do. | Butylacrylate/Acrylonitrile/Methylol methacrylamide/methacrylamide (78/19.5/1.5/1) | 0.4 Lauroyl peroxide 0.1 t-butyl per-octoate | do. | 97 | − 22 |
| C | do. | Butylacrylate/Acrylonitrile (80/20) | 0.3 Lauroyl peroxide | do. | 77 | − 25 |
| D | 0.1 PMAA copolymer | Butylacrylate/Acrylonitrile (80/20) | 0.3 Lauroyl peroxide | 0.5 Ethylhexyl thioglycolate | 50 | − 25 |
| E | 1.0 PVA | Ethyl acrylate/methylolmethacrylamide/methacrylamide (95/3/2) | 0.5 Lauroyl peroxide | 0.2 Dodecyl mercaptan | insoluble | − 20 |
| F | 0.4 Al(OH)₃ | Butylacrylate/Methylmethacrylate (80/20) | 0.2 Azoisobutyronitrile | 0.2 Dodecyl mercaptan | 87 | − 23 |
| G | do. | 2-ethylhexyl acrylate/methylolmethacrylamide (98.5/1.5) | 0.3 t-butyl perpivalate | 0.1 Dodecyl mercaptan | insoluble | < − 30 |
| H | do. | Butylacrylate/Methylmethacrylate (45/55) | 0.2 Azoisobutyronitrile | 0.2 Dodecyl mercaptan | 88 | + 33 |

II. Treating Porous Web Structures According to the Invention

The pearl suspensions shown in the Table are brought to a spreadable consistency by the addition of 0.5 percent of hydroxyethylcellulose (commercially available under the tradename "Natrosol 250 HR").

EXAMPLE 1

A cotton fabric (cretonne C 42, 24/21, bleached and desized) was coated with pearl suspension A by a painting process (thickness of the applied layer: 500 microns). The material was subsequently dried at 100°C.

In a comparison with another material coated in an analogous manner with a 50 percent aqueous polymer dispersion having the same concentration as suspension A and thickened by the addition of 0.8 percent of "Natrosol 250 HR," the following values were obtained on determining the permeability to air according to DIN 53887 (test area = 10 cm²):

Coating with pearl suspension A: 135 ml/min
Coating with corresponding dispersion: 74 ml/min The coating made with the pearl suspension is strongly absorbent when water is dropped on it, whereas water drops run off the coating applied from the dispersion.

EXAMPLE 2

A non-woven fabric, strengthened by stitching and subsequent impregnation with an acrylic resin dispersion, was directly coated with pearl suspension B (depth of coating = 300 microns) and dried at 100°C. The material was finally lacquered (depth of coating = 100 microns) with a 20 percent solution of a one-component polyurethane in dimethylformamide, tetrahydrofuran, and methyl ethyl ketone with the addition of 1 percent of diphenylsulfone-3,3'-disulfohydrazide (commercially available under the tradename "Porofor D 33") as a blowing agent, and dried for two minutes at 160°C. The permeability to air of the sample was 149 ml/min, whereas a structure coated by an analogous procedure using a dispersion of a resin corresponding to the composition of the polymer of pearl suspension B and having the same solids content and the same amount of thickening agent, had a permeability value of only 49 ml/min.

EXAMPLE 3

Pearl suspension C was coated onto a cotton fabric (cretonne C 42) in a thickness of 200 microns. This was laminated to a piece of the same fabric and the laminate was dried at 110°C. A similar laminate was prepared using a dispersion. A determination of the permeability to air gave the following values:

Laminate with pearl suspension C: 150 ml/min
Laminate with corresponding dispersion: 85 ml/min The laminate prepared using the pearl suspension has a noticeably softer hand.

EXAMPLE 4

A coating 300 microns thick was prepared by painting a layer of pearl suspension D onto a cotton fabric (cretonne C 42) and drying at 110°C. A cotton fabric was subsequently sealed to the coating over a period of one minute at 160°C. The resulting laminate has a detectably softer hand and is more transparent to air and more absorbent than is a laminate prepared from a corresponding acrylate resin dispersion. The two seals are of the same order of magnitude in strength.

EXAMPLE 5

Example 4 was repeated with the exception that the coating of pearl suspension D was applied with the aid of a stencil in the form of dots having a diameter of about 1 mm.

In comparison with the laminate described in Example 4, a significantly softer hand was obtained.

EXAMPLE 6

Pearl suspension E was printed onto a rayon staple non-woven fabric (surface density = about 50 g/m²) having a moisture content of about 120 percent with the aid of a rotating stencil (40 mesh). After drying on a perforated drum dryer at 140°C., a strong non-woven fabric was obtained.

EXAMPLE 7

Example 6 was repeated with the difference that pearl suspension E, after dilution with water to a solids content of 20 percent, was sprayed onto the non-woven fabric by an air atomization process. The diameter of the nozzle employed was 1.2 mm. 25 g/m² of the spray bath were applied to each side of the fabric. In this case also, a well-strengthened non-woven fabric was obtained after drying.

EXAMPLE 8

A wad of non-woven fabric comprising polyester fibers was sprayed with pearl suspension H diluted to a 20 percent solids content and then dried at 120°C. The non-woven fabric showed good surface bonding. The springiness and puffiness of the material was outstanding.

EXAMPLE 9

A polyacrylic high pile fabric ("fake fur") was padded on the reverse side with pearl suspension B (diluted to a solids content of 40 percent) while under tension and then dried at 130°C. with hot air in a tension frame. The supply of air was regulated so that only the treated side of the goods was heated. The coating amounted to 60 g/m². The fabric showed good pile strength and satisfactory dimensional stability. The pearl-like binder particles predominantly deposited on the surface of the reverse side of the goods, making possible subsequent lamination to a coating layer such as, for example, a nylon charmeuse or the synthetic leather described in Example 2.

EXAMPLE 10

Example 9 was repeated with the difference that the strengthening of the reverse side of the high pile fabric with a treating bath was done by mixing pearl suspension B with a 50 percent acrylic resin dispersion in the ratio of 1:1 and subsequently diluting the mixture to a solids content of 40 percent. The polymer phase of the acrylic dispersion had the following composition by weight:

96 parts of butylacrylate;
4 parts of N-methylol-methacrylamide.

In this way, a significant improvement in dimensional stability was obtained while still retaining sufficient binder on the surface to permit subsequent lamination.

EXAMPLE 11

A synthetic turf prepared from small strips of polypropylene is treated on the reverse side with pearl suspension F and dried at 110°C. The coating amounted to 200 grams/m². The prepared goods have a secure pile and are skid-resistant.

EXAMPLE 12

A strengthened needled polyamide felt (surface density = about 1,000 g/m²) was treated on its back side with pearl suspension G to form either a continuous coat or, also, stripes of the material. Drying at 120°C. followed. The uniform coating amounted to about 200 g/m²; the stripes comprised 80 g/m².

Both patterns can be adhered well and easily to a smooth substrate. The adhesion was outstanding.

What is claimed is:

1. In a process for coating or strengthening a porous web structure by contacting said web with a synthetic resin contained in particulate form in an aqueous medium, the improvement wherein said web structure (1) is contacted with an aqueous suspension, prepared by an aqueous suspension polymerization process, of a synthetic resin having a glass transition temperature below about 35°C., the resin particles in said suspension having an average particle diameter between about 0.05 mm and about 0.5 mm and being present in said suspension in an amount giving a solids content of up to 70 percent by weight, and (2) is then dried at a temperature between about 80°C. and about 180°C., the amount of resin suspension employed being such as to leave between about 10g/m² and about 200g/m² of resin in said web structure after drying.

2. A process as in claim 1 wherein the suspended resin comprises an alkyl acrylate having from 1 to 18 carbon atoms in the alcohol portion thereof.

3. A porous web structure coated or strengthened by the process of claim 1.

* * * * *